United States Patent
Esteghlal et al.

(10) Patent No.: US 12,337,708 B2
(45) Date of Patent: Jun. 24, 2025

(54) METHOD AND DEVICE FOR CHARGING AN INTERMEDIATE CIRCUIT CAPACITOR IN A HIGH-VOLTAGE NETWORK

(71) Applicant: Robert Bosch GmbH, Stuttgart (DE)

(72) Inventors: Gholamabas Esteghlal, Stuttgart (DE);
Markus Michels, Stuttgart (DE);
Michael Ruffer, Ludwigsburg (DE);
Thomas Daub, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 18/007,548

(22) PCT Filed: May 25, 2021

(86) PCT No.: PCT/EP2021/063870
§ 371 (c)(1),
(2) Date: Dec. 1, 2022

(87) PCT Pub. No.: WO2021/244899
PCT Pub. Date: Dec. 9, 2021

(65) Prior Publication Data
US 2023/0256843 A1 Aug. 17, 2023

(30) Foreign Application Priority Data

Jun. 4, 2020 (DE) ...................... 10 2020 206 987.5

(51) Int. Cl.
*H02M 3/156* (2006.01)
*B60L 53/22* (2019.01)
(Continued)

(52) U.S. Cl.
CPC .......... *B60L 53/22* (2019.02); *H02J 7/00712* (2020.01); *H02J 7/345* (2013.01); *H02M 3/156* (2013.01);
(Continued)

(58) Field of Classification Search
CPC .... B60L 53/22; B60L 2210/10; H02M 3/156; H02J 7/00712; H02J 7/345; H02J 2207/20
See application file for complete search history.

(56) References Cited

U.S. PATENT DOCUMENTS

| 8,143,856 B2 * | 3/2012 | Andrea | ................. H02M 7/797 320/109 |
| 2017/0113567 A1 * | 4/2017 | Koketsu | ................ B60L 15/007 |

(Continued)

FOREIGN PATENT DOCUMENTS

| DE | 102016005565 A1 | 11/2017 |
| EP | 2863528 A1 | 4/2015 |

(Continued)

OTHER PUBLICATIONS

Translation of International Search Report for Application No. PCT/EP2021/063870 dated Sep. 3, 2021 (2 pages).

*Primary Examiner* — Adolf D Berhane
(74) *Attorney, Agent, or Firm* — Michael Best & Friedrich LLP

(57) ABSTRACT

The invention relates to a method (100) for charging an intermediate circuit capacitor (210) in a high-voltage network (205). The high-voltage network can be connected to a power source (220) by means of at least one switch (230) and is coupled to a low-voltage network (295) by means of a DC voltage converter (250). The method comprises the steps: determining (110) a first voltage (U1) across the power source (220); determining (120) a second voltage (U2) across the intermediate circuit capacitor (210); determining (130) a first difference (D1) between the first voltage (U1) and the second voltage (U2); switching (140) the DC voltage converter (250) to the boost converter operating (Continued)

mode to charge the intermediate circuit capacitor (210) according to the determined first difference (D1).

17 Claims, 4 Drawing Sheets

(51) Int. Cl.
*H02J 7/00* (2006.01)
*H02J 7/34* (2006.01)

(52) U.S. Cl.
CPC ....... *B60L 2210/10* (2013.01); *H02J 2207/20* (2020.01)

(56) References Cited

U.S. PATENT DOCUMENTS

2019/0149055 A1* 5/2019 Tomita ................ H02M 3/3376
363/17
2019/0252994 A1 8/2019 Kobayashi

FOREIGN PATENT DOCUMENTS

| | | |
|---|---|---|
| EP | 3487055 A1 | 5/2019 |
| JP | 2019088098 A | 6/2019 |
| JP | 2019126231 A | 7/2019 |
| WO | 2019035172 A | 2/2019 |

\* cited by examiner

METHOD AND DEVICE FOR CHARGING AN INTERMEDIATE CIRCUIT CAPACITOR IN A HIGH-VOLTAGE NETWORK

BACKGROUND OF THE INVENTION

The invention relates to a method and a device for charging a DC-link capacitor in a high-voltage power supply system. In addition, the invention relates to a drive train comprising a corresponding device and a vehicle comprising a drive train as well as a computer program and a machine-readable storage medium.

Methods and devices for charging a DC-link capacitor in a high-voltage power supply system are known from the prior art. Preferably, vehicles comprising an electric drive train comprise, in a high-voltage power supply system, a DC-link capacitor, which is arranged between an energy source, preferably a DC-voltage and/or high-voltage energy source, and the power switches of a pulse-controlled inverter. Preferably, the DC-link capacitor is arranged within the pulse-controlled inverter on the DC-voltage side. The energy source, preferably a traction battery, serves the purpose of supplying electrical energy to an electric machine. The electrical energy is converted by means of the pulse-controlled inverter for this purpose. The DC voltage of the energy source is converted into an AC voltage for supplying power to a polyphase electric machine. When the vehicle is switched off or parked, the energy source is disconnected from the high-voltage power supply system by means of at least one switch and the high-voltage power supply system is discharged in order that the high-voltage power supply system itself poses no hazard in the event of touching contact with live parts. When the vehicle is brought back into operation, the energy source needs to be conductively connected to the high-voltage power supply system. Owing to the voltage difference between the discharged high-voltage power supply system and the energy source, impermissibly high compensation currents would result in the case of a connection by means of the at least one switch. In order to reduce the voltage differences prior to the connection of the energy source, the DC-link capacitor in the high-voltage power supply system is precharged or charged to a voltage which approximately corresponds to the voltage of the energy source. In the case of the subsequent connection or closing of the at least one switch, there are consequently no substantial voltage differences anymore, with the result that no relevant compensation currents occur either. The charging or precharging of the DC-link capacitor usually takes place by means of an additional circuit, which provides a parallel current path to the at least one switch and likewise comprises a switch and a resistor, precharging resistor or series resistor. For charging, the switch of the parallel current path is closed. The compensation current forming is limited to permissible values by means of the resistor. When the charging process has ended, the at least one switch between the high-voltage power supply system and the energy source is closed. Thus, the drive train is then operationally ready again. The parallel current path comprising switch and precharging resistor requires additional components and space and results in additional weight and costs. Therefore, there is a need for alternative solutions which enable charging of the DC-link capacitor without the parallel current path.

SUMMARY OF THE INVENTION

A method for charging a DC-link capacitor in a high-voltage power supply system is provided, wherein the high-voltage power supply system is connectable to an energy source by means of at least one switch, wherein the high-voltage power supply system is coupled to a low-voltage power supply system by means of a DC-DC converter. The method comprises the following steps:

determining a first voltage at the energy source,
determining a second voltage at the DC-link capacitor,
determining a first difference between the first voltage and the second voltage,
driving the DC-DC converter into the boost converter operating mode for charging the DC-link capacitor depending on the determined first difference.

A method for charging a DC-link capacitor in a high-voltage power supply system is provided. Preferably, the high-voltage power supply system is integrated in a drive train, preferably in a vehicle. The high-voltage power supply system is connectable to an energy source by means of at least one switch, preferably by means of at least one contactor or power semiconductor. The energy source is preferably a battery, a rechargeable battery or a fuel cell as traction energy source for an electric drive train comprising an electric machine for a vehicle. The voltage of the energy source is preferably approximately 300 V, 400 V, 500 V or 800 V. The high-voltage power supply system is coupled to a DC-DC converter. The DC-DC converter connects the high-voltage power supply system to a low-voltage power supply system. Preferably, the DC-DC converter comprises an inductive coupling or a transformer and therefore DC-isolates the high-voltage power supply system from the low-voltage power supply system. The DC-DC converter can also be configured as a switched-mode power supply without DC isolation. Preferably, the low-voltage power supply system is supplied electrical energy from the high-voltage power supply system. Preferably, the DC-DC converter is driven for this purpose in the buck converter operating mode. The low-voltage power supply system preferably comprises a low-voltage energy source, for example a battery or a rechargeable battery. The voltage of the low-voltage energy source is preferably approximately 12 V, 24 V or 48 V. The method comprises the following steps: determining a first voltage at the energy source. The voltage present at the energy source is determined, calculated or measured by means of a suitable voltage determination unit or voltage measurement device. Determining a second voltage at the DC-link capacitor. The voltage present at the DC-link capacitor is determined, calculated or measured by means of a suitable voltage determination unit or voltage measurement device. Determining a first difference between the first voltage and the second voltage. The first and the second determined voltages are compared with one another or their difference, a first difference, is determined. The DC-DC converter is driven depending on the determined comparison or the difference. For this purpose, it is preset to the DC-DC converter to transmit energy from the low-voltage power supply system into the high-voltage power supply system in the boost converter operating mode for charging the DC-link capacitor depending on the determined difference. Preferably, the DC-DC converter is driven into the boost converter operating mode for charging the DC-link capacitor when the first difference exceeds a first limit value. For this purpose, the first limit value is preferably preset to approximately 10 volts. By means of the charging of the DC-link capacitor, the difference between the first and the second voltage is reduced. Therefore, a method for charging a DC-link capacitor in a high-voltage power supply system is provided, wherein the energy for charging the DC-link capacitor is provided via a DC-DC converter from a low-voltage power supply system. The DC-DC converter is driven for this purpose or the boost converter operating mode is preset to the DC-DC converter for this purpose, with the result that said DC-DC converter is operated in the boost converter operating mode. For this purpose, the DC-DC converter is operated in the reverse operating mode (also: boost mode). This means that the DC-DC converter preferably generates a high voltage from the approximately 12 V of the low-voltage energy source. Thus, the DC-DC converter ensures that the high-voltage power supply system is charged to the voltage of the energy source in the high-voltage power supply system. Therefore, preferably the precharging contactor assigned to the energy source and the precharging resistor can be dispensed with, which reduces costs.

Advantageously, a method for charging a DC-link capacitor is provided which does not require a parallel current path to the at least one switch.

In another configuration of the invention, the method comprises a further step: presetting a setpoint voltage to be set on the high-voltage side at the DC-DC converter depending on the determined first voltage. As a further method step, a setpoint voltage to be adjusted on the high-voltage side is preset to the DC-DC converter. The setpoint voltage to be adjusted is preset for this purpose depending on the determined first voltage, preferably the determined voltage of the energy source. The voltage of the energy source can be different depending on the state of charge and the ageing of the energy source. The boost converter operation of the DC-DC converter is matched to the state of the energy source by means of the method step by virtue of the setpoint voltage being matched depending on the determined first voltage.

Advantageously, a method is provided which makes it possible to take into consideration different states of charge of the energy source.

In another configuration of the invention, the method comprises further steps: determining a third voltage on the high-voltage side at the DC-DC converter, wherein the step: presetting a setpoint voltage to be set on the high-voltage side at the DC-DC converter also takes place depending on the determined third voltage.

Method steps are provided for determining a third voltage on the high-voltage side at the DC-DC converter. The voltage present on the high-voltage side at the DC-DC converter is determined, calculated or measured by means of a suitable voltage determination unit or voltage measurement device. Preferably, the third voltage is determined within or outside the DC-DC converter, wherein the third voltage characterizes the voltage which is present on the high-voltage side at the DC-DC converter. Preferably, for this purpose, a low voltage is determined by means of a voltage measurement device, for example, on the low-voltage side of the DC-DC converter and calculated to give a third voltage present on the high-voltage side at the DC-DC converter. Even when the DC-link capacitor is galvanically connected to the DC-DC converter, different potentials can be set at the DC-link capacitor and on the high-voltage side at the DC-DC converter owing to ageing of the system, measurement tolerances of the voltage sensor system, unknown line lengths in the specific application case of the lines lying in between, contacts and/or further parasitic effects. This can lead to the possibility of the at least one switch between the energy source and the high-voltage power supply system not being closed in hazard-free fashion despite the charging by means of the DC-DC converter. In order that these determined potential differences can be taken into consideration in the method for charging a DC-link capacitor, the third voltage is determined. The consideration takes place by virtue of the fact that the presetting of a setpoint voltage to be set on the high-voltage side at the DC-DC converter also takes place depending on the determined third voltage.

Advantageously, a method is provided which also takes into consideration determined potential differences from the DC-link capacitor to the voltage on the high-voltage side of the DC-DC converter.

In another configuration of the invention, the method comprises a further step: outputting a first fault signal when the absolute value of a determined difference between the third voltage and the second voltage exceeds a presettable second limit value. The second voltage at the DC-link capacitor and the third voltage on the high-voltage side at the DC-DC converter would have to be substantially equal since the terminals of the DC-link capacitor are electrically connected to the terminals of the DC-DC converter. If, nevertheless, the absolute value of a difference between the determined absolute values of the third and second voltages exceeds a presettable second limit value, cable faults or a measurement fault therefore probably exists. The second limit value is for this purpose preferably preset to approximately 10 volts. In the event of this being exceeded, therefore, in this case a first fault signal is output. Depending on the first fault signal, a safe state can be initiated. Advantageously, a diagnosis for the method for charging a DC-link capacitor or for the determination of the third and second voltage is provided.

In another configuration of the invention, during the driving of the DC-DC converter in the boost converter operating mode for charging the DC-link capacitor, the preset setpoint voltage to be set on the high-voltage side is varied. The preset setpoint voltage to be set on the high-voltage side is therefore not a constant setpoint voltage, but rather its voltage level varies over the time in which the DC-DC converter charges the DC-link capacitor in the boost converter operating mode.

Advantageously, a method is provided with which a matched, variable charging of the DC-link capacitor is made possible.

In another configuration of the invention, in a first phase, the setpoint voltage is preset to be slightly lower than the first voltage. Preferably, the setpoint voltage is 90%, 80% or 70% of the first voltage. The first phase lasts until the third voltage has risen to a value which is approximately 10% lower than the setpoint voltage. In a second phase, the setpoint voltage is preset to be slightly lower than the third voltage. Preferably, the setpoint voltage is 98%, 95% or 90% of the third voltage. Furthermore, a second difference between the third voltage and the second voltage is determined. In a third phase, the setpoint voltage is preset depending on a sum of the first voltage and the determined second difference.

A method is provided in which the method for charging the DC-link capacitor is split into time phases. In a first phase, quick charging of the DC-link capacitor takes place with a preset setpoint voltage whose value is preset to be slightly lower than the first determined voltage. The first phase is maintained until the third voltage has reached a value which is approximately 10% below the preset setpoint voltage. In a second phase, the setpoint voltage is preset to be slightly lower than the third voltage, with the result that the second voltage at the DC-link capacitor does not rise any further, but rather stabilizes. In the second phase, a second difference between the third voltage and the second voltage is determined. Preferably, the second phase ends after a fixed time period, preferably 60 ms. The time period should preferably be selected to be at least as long as the determination of the third and second voltage and the determination of the difference between these variables requires. For as accurate matching of the second voltage at the DC-link capacitor to the first voltage at the energy source as possible, in a third phase, the setpoint voltage is preset depending on a sum of the first voltage and the determined second difference or preferably is preset as the sum of the first voltage and the determined second difference. Preferably, the third phase ends when the charging process has ended and therefore the first difference between the first voltage and the second voltage exceeds the second limit value. The second limit value is for this purpose preset to be so low that the voltage differences between the energy source and the DC-link capacitor are so small that a hazard-free connection of the energy source to the high-voltage power supply system is possible.

Therefore, the first difference between the first voltage and the second voltage becomes as small as possible in order to protect the at least one switch between the energy source and the high-voltage power supply system from damage. Advantageously, an effective, quick method for charging a DC-link capacitor is provided.

Preferably, then, the at least one switch between the energy source and the DC-link capacitor is closed. The DC-DC converter will preferably operate in the buck converter operating mode again and provide a low voltage on the low-voltage side in order to charge the low-voltage energy source and to supply power to further low-voltage consumers. Preferably, while the DC-DC converter is in the buck converter operating mode, the second difference between the third and second voltage will continue to be determined and stored in a variable, strongly filtered, preferably by means of a PT1 filter with a tau of several seconds. This variable is stored in the non-volatile memory (EEPROM) when the system is run down in order that it is available when the system is next started. If the variable is available when the system is started, the first phase and the second phase are not implemented, and the setpoint voltage Us in the third phase is preset depending on the stored variable as the sum of the first voltage and the stored variable. Since the first phase and the second phase are not implemented, the charging is shortened in time. If the variable is not available, charging takes place by means of the first, second and third phase. Since, therefore, the difference between the third and the second voltage is kept continuously up-to-date, effects such as ageing of the system, measurement tolerances of the voltage sensor system and line lengths in the vehicle no longer have any influence on the quality of the charging.

In another configuration of the invention, the method comprises the further steps: identifying that the first difference between the first voltage and the second voltage falls below a second limit value. Closing the at least one switch between the energy source and the high-voltage power supply system when the first difference between the first voltage and the second voltage falls below the second limit value.

The first difference between the first voltage and the second voltage is compared with a second limit value. It is identified when the first difference falls below the second limit value. When this is the case, the second voltage at the DC-link capacitor corresponds approximately to the first voltage at the energy source. The DC-link capacitor is therefore charged. Therefore, the at least one switch between the energy source and the high-voltage power supply system is closed. Preferably, the first and second limit values can be identical.

Advantageously, a method for charging the DC-link capacitor is provided which also enables continued operation of the high-voltage power supply system and in which impermissibly high compensation currents are avoided during closing of the at least one switch.

In another configuration of the invention, the method comprises the following further steps: determining a permissible charging current, presetting a setpoint charging current depending on the determined permissible charging current at the DC-DC converter, driving the DC-DC converter for charging the DC-link capacitor depending on the setpoint charging current.

A method is provided in which a setpoint charging current is preset to the DC-DC converter which is lower than a permissible charging current. Advantageously, a method is provided in which an impermissibly high charging current for charging the DC-link capacitor is avoided.

In another configuration of the invention, the method comprises the following steps: determining a first time period of the driving of the DC-DC converter for charging the DC-link capacitor. Outputting a second fault signal when the first time period exceeds a third limit value.

A method is provided in which the time period for the charging of the DC-link capacitor is detected. If the time period exceeds a presettable third limit value, either a faulty current is flowing in the high-voltage power supply system owing to a fault, short circuit or active connected high-voltage consumer or the charging current is lower than expected. The third limit value is for this purpose preferably preset to be the slightly extended conventional time period which is required for the charging. The different faults can represent a risk to the continued operation, and therefore a second fault signal is output. Depending on the second fault signal, a safe state can be initiated. Advantageously, a diagnosis for the method for charging a DC-link capacitor is provided.

In another configuration of the invention, the method comprises the following steps: determining a second time period between the step for driving the DC-DC converter for charging the DC-link capacitor and the step for identifying that the first difference between the first voltage and the second voltage falls below the second limit value. Outputting a third fault signal when the second time period falls below a fourth limit value.

A method is provided in which the time period of the charging of the DC-link capacitor up to the termination of the process, at which the first difference falls below the second limit value, is detected. If the time period falls below a presettable fourth limit value, either a faulty current is flowing in the high-voltage power supply system owing to a fault, short circuit or a defective DC-link capacitor or the charging current is higher than expected. The different faults can represent a risk to the continued operation, and therefore a third fault signal is output. The fourth limit value is for this purpose preferably preset to be the slightly shortened conventional time period which is required for the charging. Depending on the third fault signal, a safe state can be initiated. Advantageously, a diagnosis for the method for charging a DC-link capacitor is provided.

In another configuration of the invention, the method comprises the following steps: determining the quantity of charge between the step for driving the DC-DC converter for charging the DC-link capacitor and the step of identifying that the first difference between the first voltage and the second voltage falls below the second limit value. Outputting a fourth fault signal when the quantity of charge exceeds a fifth limit value.

A method is provided in which the quantity of charge, i.e. the charging current integrated over the charging time, of the charging of the DC-link capacitor up to the termination of the process, at which the first difference falls below the second limit value, is detected. If the quantity of charge exceeds a presettable fifth limit value, either a faulty current is flowing in the high-voltage power supply system owing to a fault, short circuit or active connected high-voltage consumer or the charging current is higher than expected. The different faults can represent a risk to the continued operation, and therefore a fourth fault signal is output. The fifth limit value is for this purpose preferably preset to be the slightly increased conventional quantity of charge which is required for the charging. Depending on the fourth fault signal, a safe state can be initiated. Advantageously, a diagnosis for the method for charging a DC-link capacitor is provided.

Even when not explicitly illustrated as yet, the determination of the first voltage, the second voltage, the third voltage and the first and second differences does not relate to a respective single-time process, but rather preferably the respective determinations are performed repeatedly or continuously, depending on which resources are available for the determination. It therefore goes without saying that in particular the determined value of the second and third voltage as well as the first and second differences change over the course of the method and are present in updated form for use in the method.

In addition, the invention relates to a computer program, comprising commands which, when the program is run on a computer, instruct the computer to implement the steps in the described method.

In addition, the invention relates to a computer-readable storage medium, comprising commands which, when run on a computer, instruct the computer to implement the steps in the described method.

In addition, the invention relates to a device for charging a DC-link capacitor in a high-voltage power supply system, wherein the high-voltage power supply system is connectable to an energy source by means of at least one switch, wherein the high-voltage power supply system is coupled to a low-voltage power supply system by means of a DC-DC converter, and the device is configured
- to determine a first voltage at the energy source,
- to determine a second voltage at the DC-link capacitor,
- to determine a first difference between the first voltage and the second voltage,
- to drive the DC-DC converter into the boost converter operating mode for charging the DC-link capacitor depending on the determined first difference.

A device for charging a DC-link capacitor in a high-voltage power supply system is provided. The high-voltage power supply system is connectable to an energy source by means of at least one switch. The high-voltage power supply system is coupled to a low-voltage power supply system by means of a DC-DC converter. The device is designed to determine a first voltage at the energy source, to determine a second voltage at the DC-link capacitor, and to determine a first difference between the first voltage and the second voltage. For this purpose, the device comprises preferably designed inputs and outputs which make it possible to determine voltages, preferably by means of voltage measurement devices, and preferably a u-controller for determining the difference between the two determined values.

Furthermore, the device is designed to drive the DC-DC converter into the boost converter operating mode for charging the DC-link capacitor depending on the determined first difference. For this purpose, the device comprises corresponding outputs and a connection to the DC-DC converter in order that preferably a signal is output at the DC-DC converter such that said DC-DC converter is switched into the boost converter operating mode and/or is operated in this operating mode.

Advantageously, a device for charging a DC-link capacitor is provided which does not require a parallel current path to the at least one switch.

In addition, the invention relates to a drive train comprising a described device and preferably comprising power electronics and/or an electric drive. Such a drive train is used, for example, for driving an electric vehicle. Efficient operation of the drive train is made possible by means of the method and the device.

In addition, the invention relates to a vehicle comprising a described drive train. Advantageously, therefore, a vehicle is provided which comprises a device with which efficient charging of the DC-link capacitor is made possible.

It goes without saying that the features, properties and advantages of the method according to the invention relate or are applicable correspondingly to the device or the drive train and the vehicle, and vice versa.

BRIEF DESCRIPTION OF THE DRAWINGS

Further features and advantages of embodiments of the invention can be gleaned from the description below with reference to the attached drawings.

In the text which follows, the invention will be explained in more detail with reference to some figures, in which.

DETAILED DESCRIPTION

Figure 1:
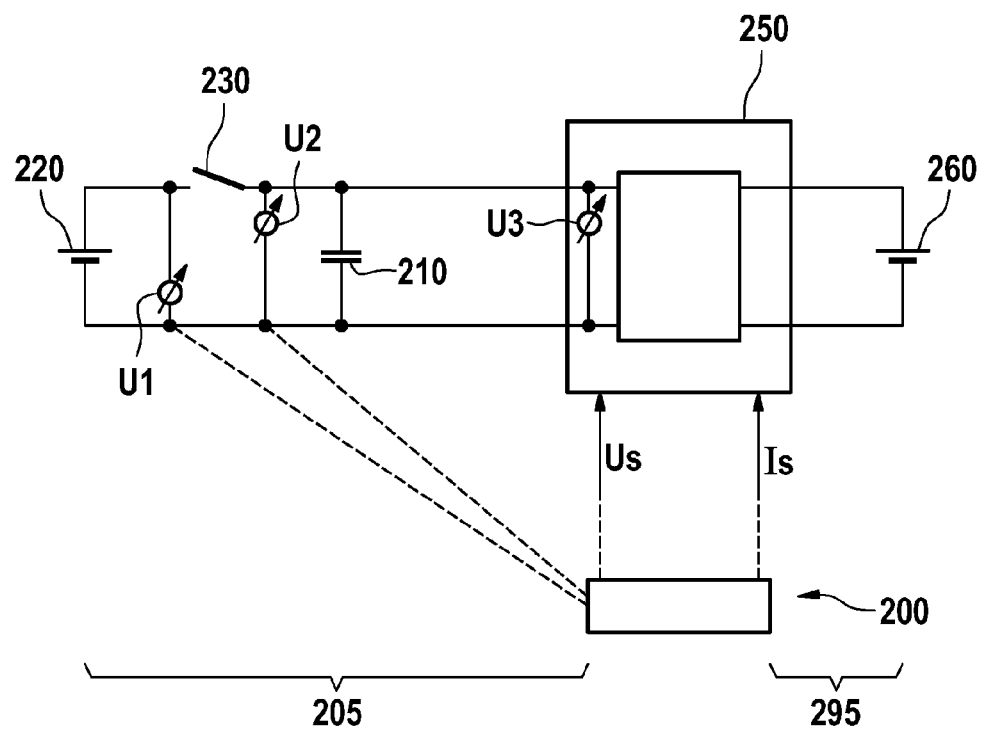
FIG. 1 shows a schematic illustration of a device for charging a DC-link capacitor.

FIG. 1 shows a device 200, which is designed to implement a method for charging a DC-link capacitor 210 in a high-voltage power supply system 205. The high-voltage power supply system 205 is connectable to an energy source 220 by means of at least one switch 230. The high-voltage power supply system 205 is coupled to a low-voltage power supply system 295 by means of a DC-DC converter 250. Preferably, the DC-DC converter 250 comprises an inductive coupling or a transformer and therefore DC-isolates the high-voltage power supply system 205 from the low-voltage power supply system 295. The DC-DC converter 250 can also be configured as a switched mode power supply without DC isolation. Preferably, the low-voltage power supply system 295 is supplied electrical energy from the high-voltage power supply system 205. Preferably, the DC-DC converter 250 is driven for this purpose in the buck converter operating mode. The low-voltage power supply system 295 preferably comprises a low-voltage energy source 260, for example a battery or a rechargeable battery and further consumers (not illustrated), for example control devices. The device 200 is configured to determine a first voltage U1 at the energy source 220, to determine a second voltage U2 at the DC-link capacitor 210 and to determine a first difference D1 between the first voltage U1 and the second voltage U2. Preferably, the device 200 is also designed to determine a third voltage U3 on the high-voltage side at the DC-DC converter and/or to determine a second difference D2 between the third voltage U3 and the second voltage U2. Depending on the determined first difference D1, the device drives the DC-DC converter 250 or gives the DC-DC converter 250 a signal so that said DC-DC converter is switched into the boost converter operating mode and is operated as boost converter. Preferably, the device 200 for this purpose gives further signals to the DC-DC converter 250, so that preferably a setpoint voltage Us and/or a charging current Is for charging the DC-link capacitor is preset to said DC-DC converter.

Figure 2:
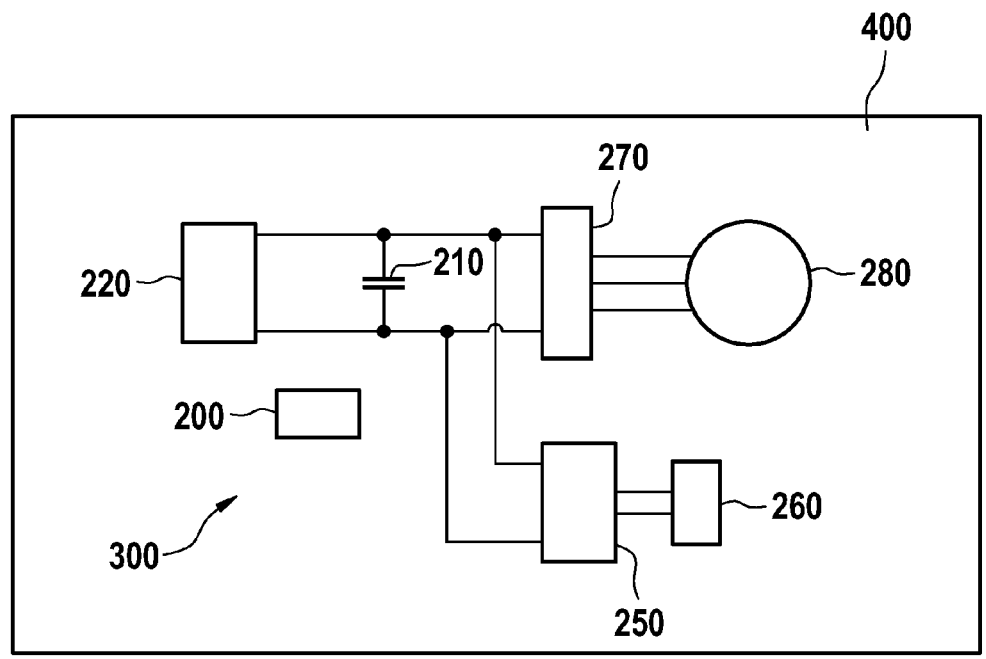
FIG. 2 shows a schematically illustrated vehicle comprising a drive train.

FIG. 2 shows a schematically illustrated vehicle 400 comprising a drive train 300. The illustration shows, by way of example, a vehicle 400, which can equally be used on land, in water and in the air. The drive train 300 comprises the device 200 and preferably power electronics, a pulse-controlled inverter 270 and/or the DC-DC converter 250. Preferably, the drive train further comprises an energy source 220, the DC-link capacitor 210, an electric machine 280 and/or a low-voltage energy source 260. The pulse-controlled inverter 270 preferably serves the purpose of supplying electrical energy to the electric machine 280 from the energy source 220.

Figure 3:
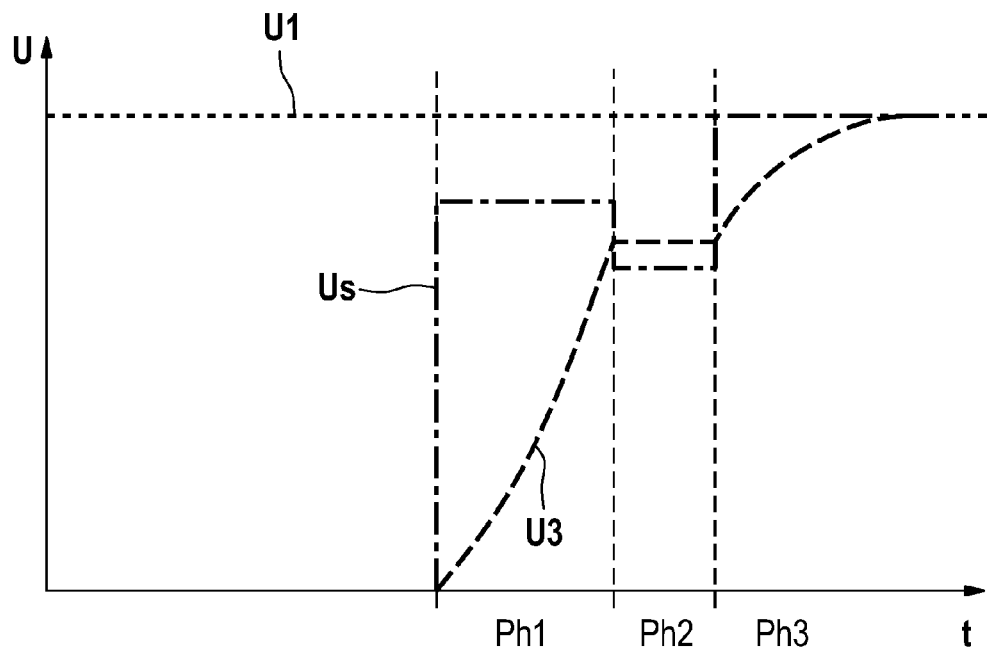
FIG. 3 shows a schematic graph having an exemplary characteristic of voltages during the phases of the method for charging a DC-link capacitor.

FIG. 3 shows a schematic graph having an exemplary characteristic of voltages during the phases of the method for charging a DC-link capacitor; in this case the voltages U (y axis) are plotted over time t (x axis). Even before the beginning of the method, the first voltage U1 is present at the energy source. In a first phase Ph1, the setpoint voltage Us is preset to be slightly lower than the first voltage U1. The first phase Ph1 lasts until the third voltage U3 has risen to a value which is approximately 10% less than the setpoint voltage Us. In the subsequent second phase Ph2, the setpoint voltage Us is preset to be slightly lower than the third voltage U3 is at that time, and a second difference D2 is determined between the third voltage U3 and the second voltage U2 (not illustrated). In a third phase Ph3, the setpoint voltage Us is preset depending on a sum of the first voltage U1 and the determined second difference D2 or preferably is preset as the sum of the first voltage and the determined second difference.

Figure 4:
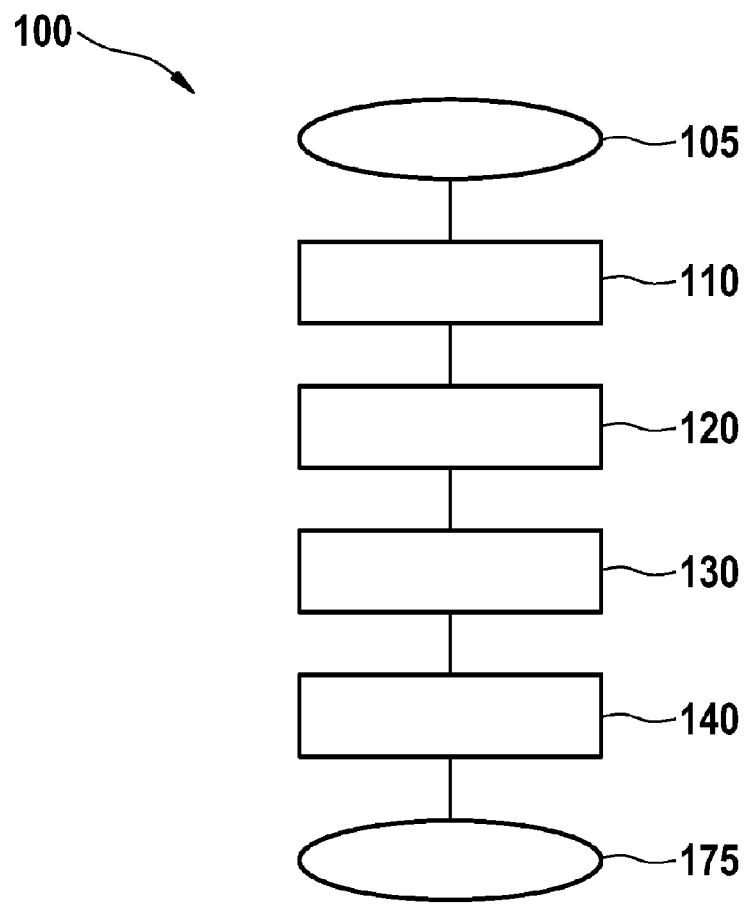
FIG. 4 shows a schematically illustrated flowchart for a method for charging a DC-link capacitor.

FIG. 4 shows a schematically illustrated flowchart for a method 100 for charging a DC-link capacitor 210. The method begins with step 105. In step 110, a first voltage U1 is determined at the energy source 220, in step 120 a second voltage U2 is determined at the DC-link capacitor 210. A determination of a first difference D1 between the first voltage U1 and the second voltage U2 takes place in step 130. In step 140, the DC-DC converter 250 is driven and switched into the boost converter operating mode for charging the DC-link capacitor 210 depending on the determined first difference D1. The method ends with step 175.

Figure 5:
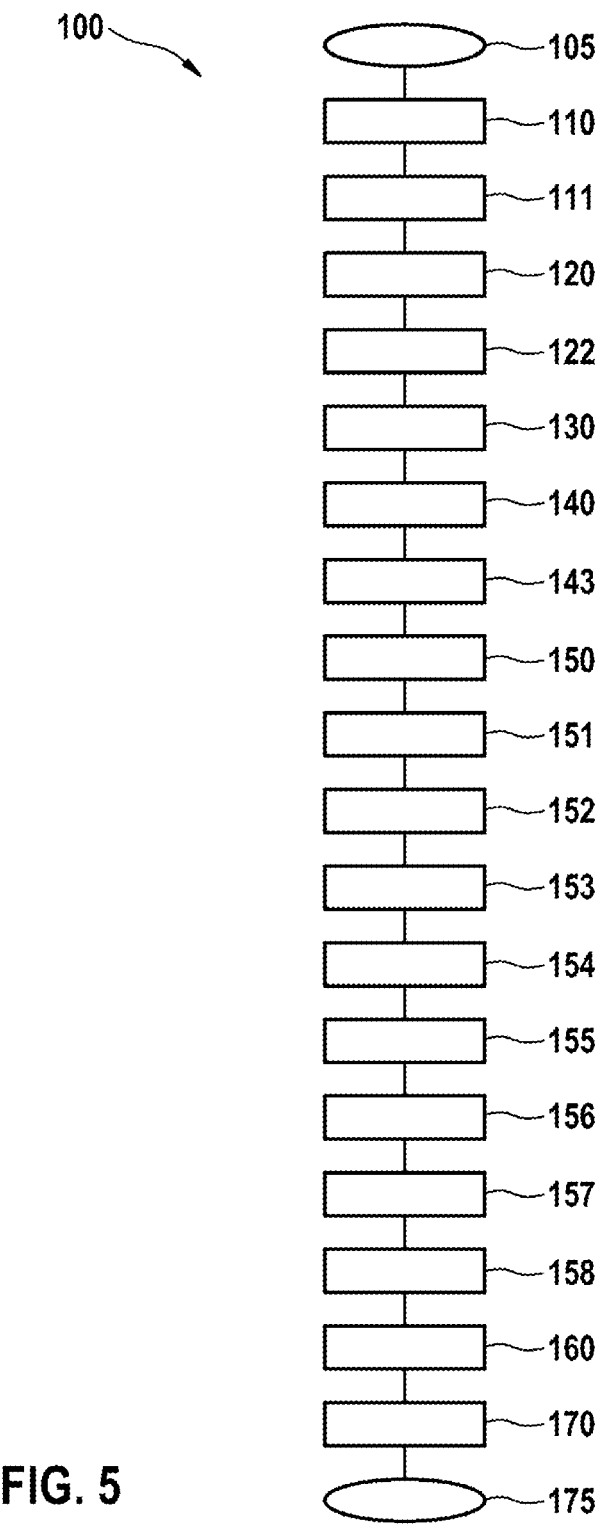
FIG. 5 shows a schematically illustrated alternative flowchart for a method for charging a DC-link capacitor.

FIG. 5 shows a schematically illustrated alternative flowchart for a method 100 for charging a DC-link capacitor 210. In addition to the method steps described already in relation to FIG. 4, the alternative flowchart preferably comprises at least some of the further steps. With step 150, a setpoint voltage Us to be set on the high-voltage side at the DC-DC converter 250 is preset depending on the determined first voltage U1. With the preferred step 122, a third voltage U3 is determined on the high-voltage side at the DC-DC converter 250, wherein, then, step 150 of presetting a setpoint voltage Us to be set on the high-voltage side at the DC-DC converter 250 also takes place depending on the determined third voltage U3. Preferably, during the driving of the DC-DC converter 250 in the boost converter operating mode for charging the DC-link capacitor 210, the preset setpoint voltage Us to be set on the high-voltage side is varied, preferably as described with reference to FIG. 3. In step 160, it is identified that the first difference D1 between the first voltage U1 and the second voltage U2 falls below a second limit value G2. Thereupon, in step 170, the at least one switch 230 between the energy source 220 and the high-voltage power supply system 205 is closed. Preferably, in step 111, a permissible charging current Iz is determined, wherein, consequently, in step 151, a setpoint charging current Is is preset depending on the determined permissible charging current Iz, and the DC-DC converter 250 is driven correspondingly in step 152 depending on the setpoint charging current Is. Preferably, in step 143, the outputting of a first fault signal F1 takes place when the absolute value of the difference between the third voltage U3 and the second voltage U2 exceeds a second limit value G2. Preferably, in step 153, the determination of a first time period T1 of the driving of the DC-DC converter 250 for charging the DC-link capacitor 210 takes place, and in step 154, the outputting of a second fault signal F2 takes place when the time period T1 exceeds a third limit value G3. Preferably, in step 155, the determination of a second time period T2 between the step 140 for driving the DC-DC converter 250 for charging the DC-link capacitor 210 and the step 160 of identifying that the first difference D1 between the first voltage U1 and the second voltage U2 falls below the second limit value G2 takes place. In step 156, the outputting of a third fault signal F3 takes place when the second time period T2 falls below a fourth limit value G4. Preferably, in step 157, the determination of the quantity of charge Q takes place between step 140 for driving the DC-DC converter 250 for charging the DC-link capacitor 210 and step 160 of identifying that the first difference D1 between the first voltage U1 and the second voltage U2 falls below the second limit value G2. In step 158, the outputting of a fourth fault signal F4 takes place when the quantity of charge Q exceeds a fifth limit value G5.

The invention claimed is:
1. A method (100) for charging a DC-link capacitor (210) in a high-voltage power supply system (205), wherein the high-voltage power supply system is connectable to an energy source (220) by means of at least one switch (230), wherein the high-voltage power supply system (205) is coupled to a low-voltage power supply system (295) by means of a DC-DC converter (250), the method comprising the following steps:
   determining (110) a first voltage (U1) at the energy source (220),
   determining (120) a second voltage (U2) at the DC-link capacitor (210),
   determining (130) a first difference (D1) between the first voltage (U1) and the second voltage (U2),
   driving (140) the DC-DC converter (250) into a boost converter operating mode for charging the DC-link capacitor (210) depending on the determined first difference (D1), and
   presetting (150) a setpoint voltage (Us) to be set on a high-voltage side at the DC-DC converter (250) depending on the determined first voltage (U1).

2. The method (100) as claimed in claim 1, further comprising the following step:
   determining (122) a third voltage (U3) on the high-voltage side at the DC-DC converter (250),
wherein the step of presetting (150) the setpoint voltage (Us) to be set on the high-voltage side at the DC-DC converter (250) also takes place depending on the determined third voltage (U3).

3. The method (100) as claimed in claim 2, wherein,
   during the driving (140) of the DC-DC converter (250) in the boost converter operating mode for charging the DC-link capacitor (210),
   the preset setpoint voltage (Us) to be set on the high-voltage side is varied.

4. The method (100) as claimed in claim 3, wherein,
   in a first phase (Ph1), the setpoint voltage (Us) is preset to 90%, 80% or 70% of the first voltage (U1), and the first phase (Ph1) lasts until the third voltage (U3) has risen to a value which is approximately 10% lower than the setpoint voltage (Us),
   in a second phase (Ph2), the setpoint voltage (Us) is preset to 98%, 95% or 90% of the third voltage (U3), and a second difference (D2) between the third voltage (U3) and the second voltage (U2) is determined,
   and, in a third phase (Ph3), the setpoint voltage (Us) is preset depending on a sum of the first voltage (U1) and the determined second difference (D2).

5. The method (100) as claimed in claim 1, further comprising the following steps:
   identifying (160) that the first difference (D1) between the first voltage (U1) and the second voltage (U2) falls below a second limit value (G2), and
   closing (170) the at least one switch (230) between the energy source (220) and the high-voltage power supply system (205) when the first difference (D1) between the first voltage (U1) and the second voltage (U2) falls below the second limit value (G2).

6. The method (100) as claimed in claim 1, further comprising the following steps:
   determining (111) a permissible charging current (Iz),
   presetting (151) a setpoint charging current (Is) depending on the determined permissible charging current (Iz) at the DC-DC converter (250), and
   driving (152) the DC-DC converter (250) for charging the DC-link capacitor (210) depending on the setpoint charging current (Is).

7. The method (100) as claimed in claim 1, further comprising the following steps:
   determining (153) a first time period (T1) of the driving of the DC-DC converter (250) for charging the DC-link capacitor (210), and
   outputting (154) a fault signal (F2) when the first time period (T1) exceeds a limit value (G3).

8. The method (100) as claimed in claim 1, further comprising the following steps:
   determining (155) a second time period (T2) between the step for driving (140) the DC-DC converter (250) for charging the DC-link capacitor (210) and the step of identifying (160) that the first difference (D1) between the first voltage (U1) and the second voltage (U2) falls below the second limit value (G2), and
   outputting (156) a fault signal (F3) when the second time period (T2) falls below a fourth limit value (G4).

9. The method (100) as claimed in claim 1, further comprising the following steps:
   determining (157) the quantity of charge (Q) between the step for driving (140) the DC-DC converter (250) for charging the DC-link capacitor (210) and the step of identifying (160) that the first difference (D1) between the first voltage (U1) and the second voltage (U2) falls below the second limit value (G2), and
   outputting (158) a fault signal (F4) when the quantity of charge (Q) exceeds a limit value (G5).

10. A non-transitory, computer-readable medium comprising commands which, when run on a computer, instruct the computer to control charging of a DC-link capacitor (210) in a high-voltage power supply system (205), wherein the high-voltage power supply system is connectable to an energy source (220) by means of at least one switch (230), wherein the high-voltage power supply system (205) is coupled to a low-voltage power supply system (295) by means of a DC-DC converter (250), by:
    determining (110) a first voltage (U1) at the energy source (220),
    determining (120) a second voltage (U2) at the DC-link capacitor (210),
    determining (130) a first difference (D1) between the first voltage (U1) and the second voltage (U2),
    driving (140) the DC-DC converter (250) into the boost converter operating mode for charging the DC-link capacitor (210) depending on the determined first difference (D1), and
    presetting (150) a setpoint voltage (Us) to be set on a high-voltage side at the DC-DC converter (250) depending on the determined first voltage (U1).

11. The non-transitory, computer-readable medium according to claim 10, wherein the commands instruct the computer to
    determine (111) a permissible charging current (Iz),
    preset (151) a setpoint charging current (Is) depending on the determined permissible charging current (Iz) at the DC-DC converter (250), and
    drive (152) the DC-DC converter (250) for charging the DC-link capacitor (210) depending on the setpoint charging current (Is).

12. The non-transitory, computer-readable medium according to claim 10, wherein the commands instruct the computer to
    identify (160) that the first difference (D1) between the first voltage (U1) and the second voltage (U2) falls below a second limit value (G2), and
    close (170) the at least one switch (230) between the energy source (220) and the high-voltage power supply system (205) when the first difference (D1) between the first voltage (U1) and the second voltage (U2) falls below the second limit value (G2).

13. A device (200) for charging a DC-link capacitor (210) in a high-voltage power supply system (205), wherein the high-voltage power supply system (205) is connectable to an energy source (220) by means of at least one switch (230), wherein the high-voltage power supply system (205) is coupled to a low-voltage power supply system (295) by means of a DC-DC converter (250), and the device (200) is configured
    to determine a first voltage (U1) at the energy source (220),
    to determine a second voltage (U2) at the DC-link capacitor (210), to determine a first difference (D1) between the first voltage (U1) and the second voltage (U2),
    to drive the DC-DC converter (250) into the boost converter operating mode for charging the DC-link capacitor (210) depending on the determined first difference (D1), and to preset a setpoint voltage (Us) to be set on a high-voltage side at the DC-DC converter (250) depending on the determined first voltage (U1).

14. A drive train (300) comprising a device (200) as claimed in claim 13.

15. A vehicle (400) comprising a drive train (300) as claimed in claim 14.

16. The device (200) according to claim 13, wherein the device (200) is configured to determine (111) a permissible charging current (Iz),
   to preset (151) a setpoint charging current (Is) depending on the determined permissible charging current (Iz) at the DC-DC converter (250), and
   to drive (152) the DC-DC converter (250) for charging the DC-link capacitor (210) depending on the setpoint charging current (Is).

17. The device (200) according to claim 13, wherein the device (200) is configured to identify (160) that the first difference (D1) between the first voltage (U1) and the second voltage (U2) falls below a second limit value (G2), and
   to close (170) the at least one switch (230) between the energy source (220) and the high-voltage power supply system (205) when the first difference (D1) between the first voltage (U1) and the second voltage (U2) falls below the second limit value (G2).

* * * * *